(12) United States Patent
Nesemann et al.

(10) Patent No.: US 12,556,096 B2
(45) Date of Patent: Feb. 17, 2026

(54) METHOD FOR INCREASING THE LIFETIME OF CONVERTER SWITCHES, AND SYSTEM

(71) Applicant: SMA Solar Technology AG, Niestetal (DE)

(72) Inventors: Karl Nesemann, Kaufungen (DE); Zoltan Klausz, Guxhagen (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 18/948,777

(22) Filed: Nov. 15, 2024

(65) Prior Publication Data

US 2025/0079994 A1   Mar. 6, 2025

Related U.S. Application Data

(63) Continuation of application No. PCT/EP2023/060676, filed on Apr. 24, 2023.

(30) Foreign Application Priority Data

May 23, 2022   (DE) ................... 10 2022 112 903.9

(51) Int. Cl.
  *H02M 3/158*   (2006.01)
  *H02J 3/32*   (2006.01)
  (Continued)

(52) U.S. Cl.
  CPC ............ *H02M 3/1582* (2013.01); *H02J 3/32* (2013.01); *H02J 3/381* (2013.01); *H02M 1/327* (2021.05);
  (Continued)

(58) Field of Classification Search
  CPC ...... H02M 3/158; H02M 3/1582; H02M 1/32; H02M 1/327; H02M 3/1584; H02J 3/32; H02J 3/38; H02J 3/381; H02J 2300/24
  See application file for complete search history.

(56) References Cited

U.S. PATENT DOCUMENTS

| | | | |
|---|---|---|---|
| 9,859,787 B2 | 1/2018 | Wagoner et al. | |
| 10,305,287 B2 | 5/2019 | Hoerist et al. | |
| (Continued) | | | |

FOREIGN PATENT DOCUMENTS

| | | |
|---|---|---|
| CN | 106067680 A | 11/2016 |
| CN | 109391232 A | 2/2019 |
| (Continued) | | |

OTHER PUBLICATIONS

International Search Report dated Jun. 30, 2023, for International Application No. PCT/EP2023/060676.
(Continued)

*Primary Examiner* — Robert L Deberadinis
(74) *Attorney, Agent, or Firm* — Eschweiler & Potashnik, LLC

(57) ABSTRACT

The disclosure relates to a method for increasing the lifetime of converter switches in a system having an energy source connected to a DC bus and a DC-to-DC converter having the converter switches. The method includes determining a system state in which electrical power of the energy source is available for which no transmission via the DC-to-DC converter and no output to further participants of the DC bus is provided, and operating the DC-to-DC converter during the determined system state such that power dissipation is generated in the DC-to-DC converter without power being transmitted via the DC-to-DC converter. A system having an energy source and a DC-to-DC converter having the con-
(Continued)

verter switches is disclosed, as well as an energy-generating system having such a system.

17 Claims, 3 Drawing Sheets

(51) Int. Cl.
    *H02J 3/38*     (2006.01)
    *H02M 1/32*     (2007.01)
(52) U.S. Cl.
    CPC ....... *H02M 3/1584* (2013.01); *H02J 2300/24* (2020.01)

(56) References Cited

U.S. PATENT DOCUMENTS

| | | |
|---|---|---|
| 2003/0057914 A1 | 3/2003 | Kamatsu et al. |
| 2011/0309776 A1 | 12/2011 | Miyamoto |
| 2016/0315533 A1 | 10/2016 | Wagoner et al. |

FOREIGN PATENT DOCUMENTS

| | | |
|---|---|---|
| DE | 102016113873 A1 | 2/2017 |
| EP | 2600510 A1 | 6/2013 |
| EP | 3139481 A1 | 3/2017 |
| WO | 2017187256 A2 | 11/2017 |

OTHER PUBLICATIONS

Akhilesh K. et al., "Control Scheme for Improved Efficiency in H-bridge Buck-Boost Converter." Publication date unknown.

Akhilesh K. et al., "Dead-Zone Free Control Scheme for H-Bridge Buck-Boost Converter." IEEE Transactions on Industry Applications, vol. 56, No. 6, Published Nov./Dec. 2020.

Saeed Peyghami et al., System-Level Lifetime-Oriented Power Sharing Control of Paralleled DC/DC Converters. Published in 2018.

METHOD FOR INCREASING THE LIFETIME OF CONVERTER SWITCHES, AND SYSTEM

REFERENCE TO RELATED APPLICATIONS

This Application is a Continuation of International Application number PCT/EP2023/060676, filed on Apr. 24, 2023, which claims the benefit of German Application number 10 2022 112 903.9, filed on May 23, 2022. The contents of the above-referenced Patent Applications are hereby incorporated by reference in their entirety.

FIELD

The disclosure relates to a method for increasing the lifetime of converter switches and to a system with a generator and a DC/DC converter having the converter switches.

BACKGROUND

For energy generation systems, especially PV systems (PV: photovoltaics), power converters are used, which can have clocked semiconductor switches, so-called converter switches. For such semiconductor switches, temperature fluctuations lead to a reduced lifetime.

EP2600510A1 describes a method in which an electrical power converter is controlled in such a way that, in addition to an output current, a current is generated which does not influence the output current and at the same time heats converter switches to a predetermined target temperature.

SUMMARY

The application is directed to increasing the lifetime of converter switches.

In a system, an energy source, for example, a generator, is connected to a DC bus together with a DC/DC converter. The energy source is, for example, a PV generator. In one embodiment the DC/DC converter has converter switches in the form of semiconductor switches. The DC/DC converter is configured, for example, to transfer electrical power from the DC bus to a DC energy storage device, such as a battery, or in the opposite direction. The DC storage device can, for example, be configured to receive and store electrical energy generated by the energy source. In one embodiment, a method for increasing the lifetime of DC/DC converter switches comprises:
  determining a system state in which electrical power is available from the energy source, for which no transmission via the DC/DC converter and no output to further participants of the DC bus is provided, and
  operating the DC/DC converter during the determined system state such that power dissipation is generated in the DC/DC converter without power being transmitted from the DC/DC converter to external components.

The determined system state therefore relates to a system state in which it is not provided to transfer electrical energy to the DC storage device via the DC/DC converter. This can be the case, for example, if the battery is already fully charged. Another participant in the DC bus can, for example, be an inverter, which is provided to transfer electrical energy from the DC bus to an AC network. The AC network can, for example, be an AC supply network. Further participants in the DC bus can be, for example, additional DC loads. A DC bus usually has two conductors which are at different electrical potentials and between which the DC bus voltage is applied.

The method therefore makes it possible to operate the DC/DC converter during the determined system state in such a way that power dissipation is generated in the DC/DC converter, for example, by a circulating current flowing within the DC/DC converter, without power being transmitted via the DC/DC converter, so that the converter switches are kept in a heated state compared to an inactive state. In this application, DC (direct current) refers to direct current/direct voltage. In this application, AC (alternating current) refers to alternating current/alternating voltage.

The system state in which electrical power from the energy source is available and for which no transmission via the DC/DC converter and no output to further participants in the DC bus is provided can, for example, be a system state in which the battery is already fully charged, and wherein no, or at least no complete, feeding of the currently available power via an inverter connected to the DC bus into an AC network is provided, and at the same time no further participants connected to the DC bus, for example further DC loads, for receiving the electrical energy are provided with electrical energy. In such a state, electrical energy from the energy source may be available unused and can be used for the method according to the disclosure without disadvantages.

In a good weather period for a PV system, this can be, for example, the afternoon to early evening on a nice day, when the battery has already been charged by the PV generator earlier in the day and, due to the solar radiation still present, the PV generator can produce more electrical energy than is provided for supplying the DC bus. The method makes it possible to determine such an operating state and at the same time enables an operation of the DC/DC converter in which no energy is transmitted via the DC/DC converter (e.g., towards the DC storage device); rather, the DC/DC converter only receives energy in order to keep the converter switches warm through an internal current flow in the DC/DC converter. Keeping the device warm is achieved here by the current flow within the DC/DC converter and the power dissipation generated thereby in the form of heat.

In one embodiment, the DC/DC converter comprises a first half bridge with a series connection of a first switch and a second switch. The first and second switches are, in one embodiment, configured as semiconductor switches. The first and second switches are converter switches of the DC/DC converter. The first half-bridge is arranged between output-side terminals of the DC/DC converter. The output-side terminals are provided, for example, to be connected to a DC storage device. The DC/DC converter further comprises a second half-bridge with a series connection of a third switch and a fourth switch. The third and fourth switches are converter switches of the DC/DC converter and are, in one embodiment, configured as semiconductor switches. The second half-bridge is arranged between the input-side terminals, connected to the DC bus, of the DC/DC converter. A center terminal of the first half-bridge and the second half-bridge are connected to each other via a choke. The center terminals of the first and second half-bridge are each arranged between the two switches. A choke is to be regarded as an electrical choke, i.e. configured as an inductance. The second and fourth switches have a common terminal, which can be connected, for example, to one of the conductors of the DC bus.

For such a DC/DC converter, in one embodiment of the method the second switch is permanently closed and the first switch is permanently opened during the determined system state. This effectively prevents power flow through the DC/DC converter. The third switch is clocked during the determined system state. Clocking means that the switch is controlled in such a way that it is temporarily opened and temporarily closed.

Controlling the switches in this way enables electrical energy to be taken from the DC network and to flow as current, which generates power dissipation, within the DC/DC converter. The flowing current generates power dissipation and the power dissipation warms the switches. When the third switch is switched on, a current flows through the third and second switches and through the choke. When the third switch is open, an electric current flows through the second switch and the fourth switch. Depending on the switching state of the fourth switch, the current flows via a freewheeling diode arranged parallel to the fourth switch or via the closed fourth switch.

In one embodiment, the third and fourth switches are clocked to operate the DC/DC converter in the determined operating state. In a further embodiment, the third and fourth switches are clocked in complementary fashion. Complementary clocking means that during the time periods when the third switch is closed, the fourth switch is open, and vice versa. It is also possible to keep the fourth switch open during the determined system state, since the desired current flow for heating the converter switches can also occur via the freewheeling diode of the fourth switch.

In one embodiment of the method, the third switch is clocked with a duty cycle such that a permissible nominal current of the DC/DC converter is not exceeded. For example, the third switch is operated in a current-controlled manner and is opened when a switch-off threshold value below the nominal current is exceeded, and is closed again when the value falls below a switch-on threshold value. In the method, the current flowing through the DC/DC converter is determined by the duty cycle of the third switch, since electrical power is drawn from the DC network only when the third switch is closed. However, with complementary clocking of the fourth switch, the fourth switch is clocked with the corresponding duty cycle in a manner complementary to the third switch.

In one embodiment of the method, the third switch is clocked with a duty cycle that depends on a temperature measured in the DC/DC converter. The duty cycle can, for example, be selected such that a predeterminable target temperature is aimed for in the DC/DC converter. It is also possible to increase the current flow in the determined system state at low temperatures in the DC/DC converter in order to continue to achieve the desired heating of the converter switches. For example, the above-mentioned switch-off threshold value and/or the switch-on threshold value can be determined as a function of the measured temperature. The duty cycle can of course also depend on other influencing factors, for example, the DC bus voltage.

Instead of or in addition to the temperature measured in the DC/DC converter, the clocking of the third switch or the power dissipation generated by the method according to the disclosure can be determined dependent on a temperature measured external to the DC/DC converter. For this purpose, in one embodiment, determining the system state includes detecting a temperature of a component with which the DC/DC converter is in thermal contact, but which itself is not part of the DC/DC converter, and whose temperature should not fall below a predetermined value. In one embodiment, this can be, for example, a battery that is charged and discharged via the DC/DC converter. Batteries of commonly used types have the property that below a critical charging temperature they cannot, or should not, be charged, even if discharging at such a low temperature is possible. Here, the generated power dissipation can be used to increase the temperature of the battery that is in thermal contact with the DC/DC converter or to keep it above the specified temperature. The power dissipation can also be taken completely or partially from the battery, and for this purpose the fourth switch can be clocked with a suitable duty cycle.

In one embodiment of the method, the system state is determined depending on the voltage of the DC bus. The system state to be determined, in which no consumption by further participants of the DC bus is provided and at the same time no power transmission via the DC/DC converter is provided, can be determined depending on the voltage on the DC bus. The voltage on the DC bus is determined, for example, by the inverter on the DC bus, the further loads on the DC bus, and/or the energy source.

In a further embodiment of the method, the determination of the system state is indicated to the DC/DC converter by an input signal. This embodiment can be used, for example, when the system state is determined by a control device and then transmitted to the DC/DC converter, where a controller of the DC/DC converter controls the converter switches of the DC/DC converter according to the described method. The control device of the DC/DC converter can be understood here as part of a control device of the system. This embodiment can also be used if the system state is determined, for example, based on a voltage measurement on the DC bus and is transmitted to the DC/DC converter, where a controller of the DC/DC converter then controls the converter switches according to the method. In one embodiment, control device(s) can be computing units that have at least a processor, a memory, and a communication interface.

In one embodiment, a system includes an energy source and a DC/DC converter. The energy source and the DC/DC converter are each connected to a DC bus. The DC/DC converter has converter switches which can be controlled to open and close for power conversion by the DC/DC converter. Furthermore, a control device is provided which is configured to carry out one of the methods described above. The control device can, for example, be arranged in the DC/DC converter and/or on another computing unit of the system. The control device can also be arranged, for example, distributed over the DC/DC converter and one or more further computing devices of the system, or remotely from the system. The control device can also be configured to control the DC/DC converter and/or further participants of the DC bus.

In one embodiment of the system, the first switch is thermally coupled to at least one of the second, third, and/or fourth switches. In the method, the current required to generate the power dissipation flows through the second, third, and fourth switches. These can therefore be heated by the power dissipation. By coupling the first switch with the second, third, and/or fourth switch, the first switch can also be heated to increase its lifetime.

In one embodiment, the first switch is thermally coupled to the choke as a heat storage device. When the method is carried out, the current to generate the power dissipation flows through the choke of the DC/DC converter. To heat the first switch, this switch is thermally coupled to the choke, which serves as a heat storage device. This can also cause a heating of the first switch.

In one embodiment, the converter switches and the choke are thermally coupled to a common heat sink. The common heat sink can ensure a uniform heat exchange between the converter switches and the choke, thus achieving uniform heating of the converter switches.

In one embodiment of the system, the energy source is a PV generator. The method is, in one embodiment, advantageous for implementing a system with a PV generator, since solar energy generated by the PV generator can be present when the system state is determined in which no, or at least no complete, feed-in to the grid of the power generated by the energy source is possible or desired, and at the same time a battery connected to the system is already fully charged or further charging is not provided. This solar energy can then be used to heat the converter switches, thus extending the life of the converter switches.

It is also conceivable that during the execution of the method according to the disclosure it is checked continuously or occasionally whether the condition that no other use of the power used to heat the DC/DC converter is provided is still fulfilled. If this is not the case, the heating can be stopped or the power used for heating can be reduced.

In one embodiment of the system, the DC/DC converter comprises a first and a second sub-converter. The two sub-converters are each connected to the DC bus at the input side. When the system state is determined, the two sub-converters are to be connected to each other at the output side via an optional coupling switch in such a way that the two sub-converters transmit power flows of equal magnitude but opposite to each other. However, the sub-converters can also be permanently connected to each other at the output side without a coupling switch. Due to the equal but opposite power flows, power dissipation is generated in the sub-converters by the converter switches and the converter switches are thus kept in a heated state. This occurs without any overall power transfer of the DC/DC converter, i.e. without any electrical power being output via the output terminals of the DC/DC converter. Advantageously, the two sub-converters are operated in parallel when transmitting power via the DC/DC converter. This means that to transfer total power across the DC/DC converter, both sub-converters are connected to the DC bus at the input side and both sub-converters are connected to the output terminals of the DC/DC converter at the output side. When the system state is determined, the output sides of the sub-converters are then connected via the coupling switch in such a way that they transmit power flows of equal magnitude but opposite directions to each other. Instead of a coupling switch, the sub-converters can also be permanently connected in parallel at the output side.

The application further relates to an energy generation plant with one of the systems described above and an inverter connected to the DC bus for feeding the power generated by the energy source into an alternating current network. The alternating current network is preferably an AC supply network.

DESCRIPTION OF THE DRAWINGS

Examples of the application are explained in more detail below with reference to the accompanying figures. In the drawings.

The same reference symbols are used in the figures for identical or similar elements.

DETAILED DESCRIPTION

Figure 1:
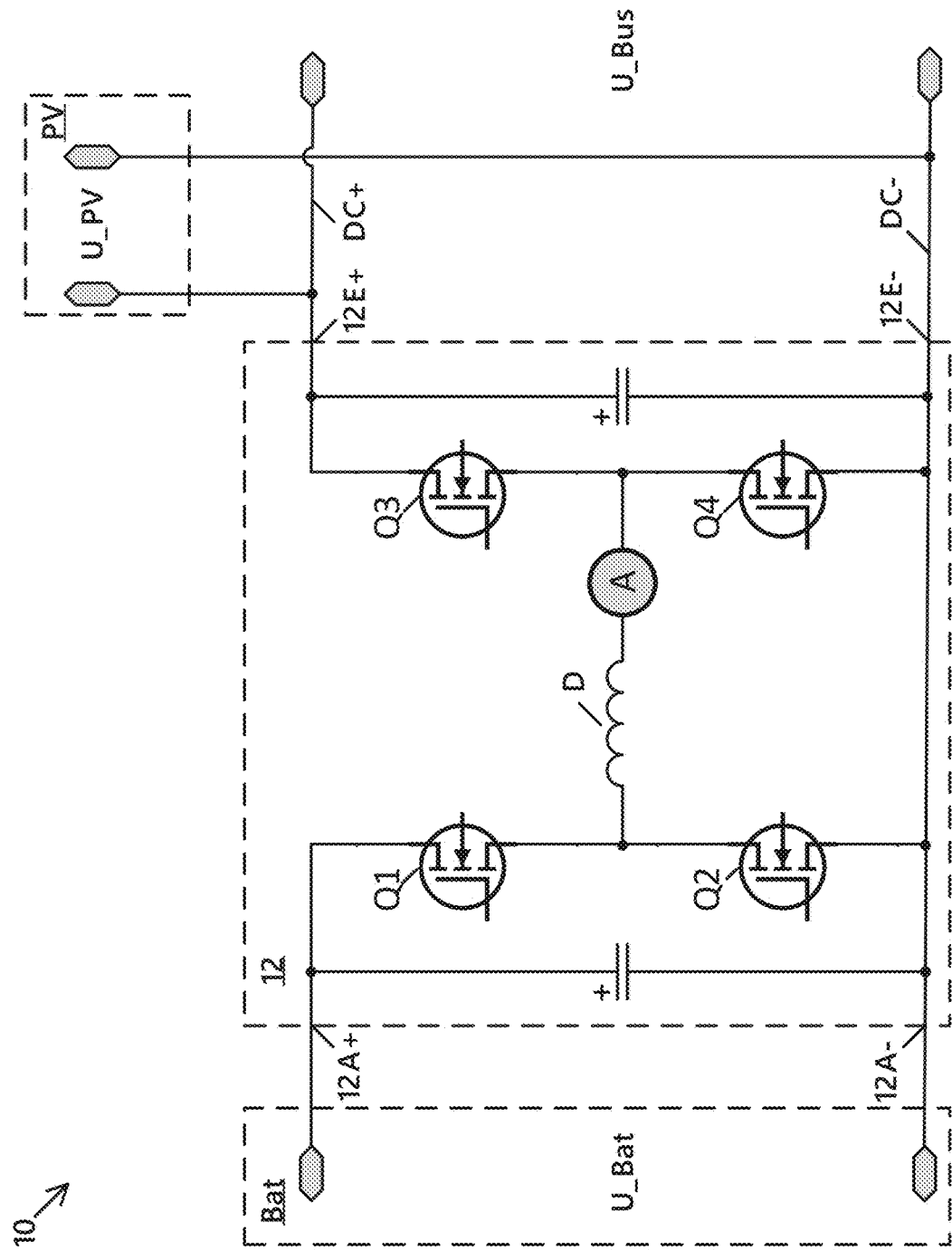
FIG. 1 shows a schematic representation of an embodiment of a system with an energy source and a DC/DC converter.

FIG. 1 schematically shows an embodiment of a system 10 which comprises a DC bus DC+ DC−, to which the energy source PV, with a voltage U_PV, and the DC/DC converter 12 are connected. The DC bus DC+ DC− has two conductors DC+ and DC−, which are at different electrical potentials. A DC bus voltage U_Bus is present between the two conductors of the DC bus DC+ DC−. Additional DC bus devices, which are not shown in FIG. 1, can be connected to the DC bus DC+ DC−. The additional DC bus participants can be, for example, an inverter, which can be provided to feed electrical power generated by the PV energy source into an AC supply network.

A DC/DC converter 12 is configured to take electrical power from the DC bus DC+ DC−, convert it and transfer it, for example, to a DC storage device Bat connected to its output terminals 12A+ 12A− in order to be able to make this power available to the DC bus again at a later time. The DC storage device Bat has a voltage U_Bat between its terminals. The DC/DC converter has a series connection of a first and a second semiconductor switch Q1, Q2 between its output terminals 12A+ 12A−. A capacitor is arranged in parallel to this series connection of the first and second switches Q1 and Q2. Between its input terminals, 12E+ 12E−, the DC/DC converter 12 has a series connection of a third and a fourth semiconductor switch Q3, Q4. A capacitor is arranged between its input terminals 12E+ 12E− in parallel to the series connection of the third and fourth switches Q3, Q4. The semiconductor switches Q1, Q2, Q3, Q4 correspond to converter switches of the DC/DC converter 12 and can have intrinsic freewheeling diodes, or freewheeling diodes are connected antiparallel to them. The two series circuits of switches Q1, Q2 and Q3, Q4 correspond to two half-bridges of the DC/DC converter 12. The two half-bridges (Q1/Q2 and Q3/Q4) are connected in the middle between the two switches by a choke D. A current meter A is arranged in series with the choke D. The second switch Q2 and the fourth switch Q4 are connected to each other, for example, via conductor DC− of the DC bus.

Figure 2:
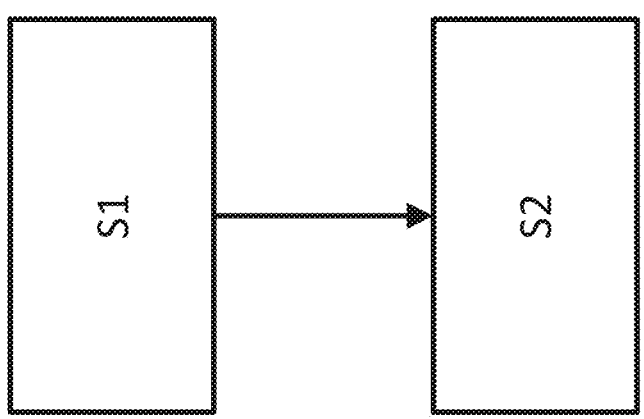
FIG. 2 schematically shows a method for increasing the lifetime of converter switches.

FIG. 2 schematically shows a method for increasing the lifetime of converter switches Q1, Q2, Q3, Q4. In a system 10 shown by way of example in FIG. 1 or FIG. 3 with a DC/DC converter 12 and an energy source PV, both of which are connected to a DC bus DC+ DC−, electrical energy generated by the energy source PV can be fed into the DC bus DC+ DC−. The energy source PV has a PV voltage U_PV between its terminals. The DC/DC converter 12 can draw electrical power from the DC bus DC+ DC− and output it via its output terminals 12A+ 12A−, for example, to a DC storage device Bat.

In the method, at act S1 a system state is determined in which electrical power from the energy source PV is available on the DC bus DC+ DC−. The system state is determined when no transmission of electrical power via the DC/DC converter 12 is provided and at the same time no output of electrical power to further participants of the DC bus DC+ DC− is provided. Further participants in the DC bus DC+ DC− can be, for example, additional DC loads (not shown) and/or an inverter (not shown). The inverter can be designed, for example, to feed electrical power into an AC supply network. A state of the system can now arise in which the PV energy source can generate electrical power, but no, or at least no complete transmission of the power via the inverter of the power that can be generated is provided. The reasons for this may, for example, be of a regulatory nature. At the same time, it is possible that no transfer to the DC storage device Bat is provided, for example, because the DC storage device Bat is already full. This is an example of a system state determined in act S1.

At act S2, after determining the system state at S1, the DC/DC converter 12 is operated in such a way that power dissipation is generated in the DC/DC converter 12 without power being transmitted via the DC/DC converter 12. This causes the converter switches Q1, Q2, Q3, Q4 of the DC/DC converter 12 to be kept in a heated state compared to an inactive state. The heated state is caused on the one hand by the switching operations and by the current flowing in the DC/DC converter 12 and the power dissipation generated thereby.

In one embodiment, the system state to be determined in method act S1 can, for example, take place by measuring the voltage U_Bus of the DC bus DC+ DC−. To operate the DC/DC converter 12 at act S2, the first switch Q1 can now be permanently opened. The second switch Q2 can remain permanently closed. The third switch Q3 is clocked. The fourth switch Q4 can, for example, be permanently open. It is also possible to close the fourth switch Q4 when the third switch Q3 is in a state in which it is open. A complementary clocking of the third and fourth switches, Q3, Q4 would therefore be possible. It is also possible for the clocking of the third and fourth switches Q3, Q4 to be not completely complementary, provided that the fourth switch Q4 is open at the times when the third switch Q3 is closed. A possible clocking of the third switch Q3 in one embodiment is a duty cycle of 30 μs at 100 Hz clock frequency.

During operation at act S2, when the third switch Q3 is closed, a current flows via the third switch Q3 via the choke D and the second switch Q2. When the third switch Q3 is then opened, the current can continue to flow via the switch Q4 via the choke D back to the second switch Q2. Depending on the switch type, the current flow through the fourth switch Q4 can occur either via a freewheeling diode arranged anti-parallel to the fourth switch Q4 or an intrinsic freewheeling diode, or, if the switch Q4 is closed, directly via the closed switch Q4. This creates a current flow through the third, second and fourth switches Q3, Q2, Q4 without any current flowing through the output terminals 12A+ 12A− of the DC/DC converter 12. This current flow generates power dissipation, which heats the converter switches Q1, Q2, Q3, Q4. Since there is no direct current flow through the first switch Q1, it can be heated, for example, via the choke D as a common heat storage device or a common heat sink with the choke D and the switches Q2, Q4, Q3. However, it is also conceivable for the converter switch Q1 to be installed together with the converter switch Q2 in a module and therefore to be already thermally coupled therewith and heated.

Figure 3:
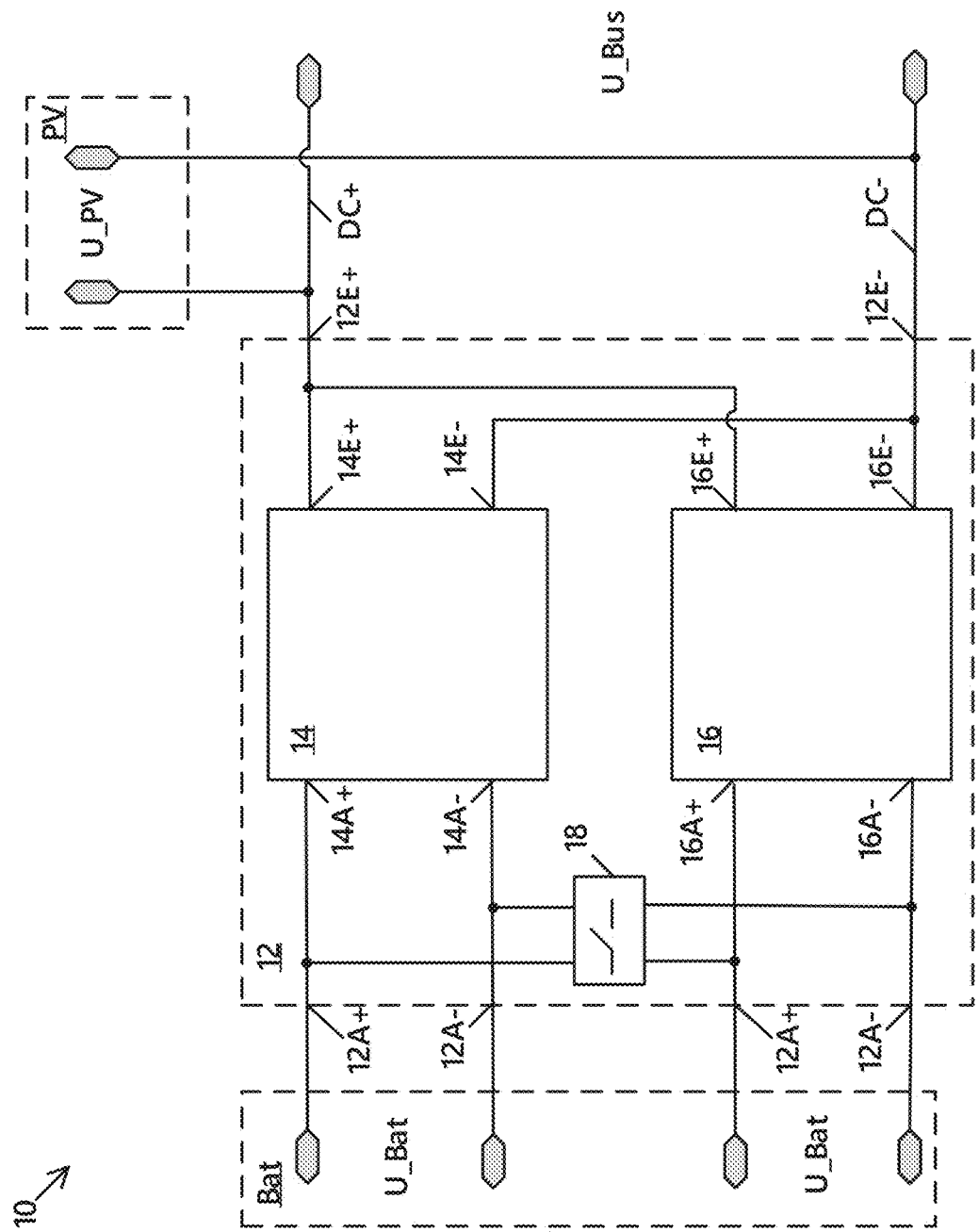
FIG. 3 shows a schematic representation of an embodiment of a system with an energy source and a DC/DC converter.

In the system 10 shown in FIG. 3, the DC/DC converter 12 has two sub-converters 14, 16. The first sub-converter 14 and the second sub-converter 16 are each connected at the input side to the DC bus DC+ DC−. The input terminal 14E+ of the first sub-converter 14 and the input terminal 16E+ of the second sub-converter 16 are connected to the input terminal 12E+ of the DC/DC converter 12. The input terminal 14E− of the first sub-converter 14 and the input terminal 16E− of the second sub-converter 16 are connected to the input terminal 12E− of the DC/DC converter 12. The two sub-converters 14, 16 here also correspond to DC/DC converters. In normal operation, i.e. when the DC/DC converter 12 draws electrical power from the DC bus DC+ DC− and transfers it to the DC storage device Bat, the sub-converters 14, 16 are connected in parallel at the input side, as shown in FIG. 3. At the output side, the DC/DC converter 12 has separate output terminals 12A+, 12A− for each sub-converter 14, 16, to each of which terminals a battery can be connected. A coupling switch 18 can optionally be provided between the output terminals 14A+ and 16A+ and/or between the output terminals 14A− and 16A− in order to enable a temporary parallel connection of the sub-converters 14, 16 at the output side or to separate them from one another at the output side in a single-pole or all-pole manner. However, it is also conceivable for the output terminals 12A+, 12A− assigned to the sub-converters to be connected to the same battery and thus for the sub-converters 14, 16 to also be permanently connected in parallel at the output side.

During operation at act S2 of the method, the sub-converters 14, 16 are now connected in parallel at the output side via the optional coupling switch (i.e., wherein the switch 18 is closed), unless they are already permanently connected in parallel, wherein the electrical power output by one of the sub-converters 14, 16 is of the same magnitude, but is absorbed by the respective other sub-converter, so that no electrical power is exchanged via the output terminals 12A+ 12A− of the DC/DC converter 12. In the state of act S2, electrical power is absorbed via the input terminals 12E+ 12E−, but further power flows run completely within the DC/DC converter 12 and no electrical power is exchanged via the output terminals 12A+ 12A−.

What is claimed is:

1. A method for increasing a lifetime of converter switches in a system comprising an energy source which is connected to a DC bus together with a DC/DC converter comprising the converter switches, the method comprising:
   determining a system state in which electrical power is available from the energy source for which no transmission via the DC/DC converter and no output to further participants of the DC bus is provided via the DC/DC converter, and
   operating the DC/DC converter during the determined system state such that power dissipation is generated in the DC/DC converter without power being transmitted via the DC/DC converter.

2. The method according to claim 1, wherein the DC/DC converter is operated during the determined system state such that a circulating current flowing via two or more of the converter switches is generated within the DC/DC converter.

3. The method according to claim 1, wherein the DC/DC converter comprises a first half-bridge comprising a series connection of a first switch and a second switch, which are together arranged between output-side terminals of the DC/DC converter, and a second half-bridge comprising a series connection of a third switch and a fourth switch, which are together arranged between input-side terminals of the DC/DC converter connected to the DC bus, wherein center terminals of the first half-bridge and the second half-bridge are connected to one another via a choke and the second switch has a common terminal with the fourth switch,
   wherein the DC/DC converter is configured to permanently close the second switch and permanently open the first switch during the determined system state, while the third switch is clocked.

4. The method according to claim 3, wherein the third switch and the fourth switch are clocked in a complementary fashion during the determined system state.

5. The method according to claim 4, wherein the clocking of the third switch and the fourth switch takes place with a duty cycle such that a permissible nominal current of the DC/DC converter is not exceeded.

6. The method according to claim 3, wherein the clocking of the third switch and the fourth switch takes place with a duty cycle which is selected such that a temperature measured in the DC/DC converter is controlled to a target temperature.

7. The method according to claim 1, wherein the determining of the system state takes place depending on a voltage of the DC bus.

8. The method according to claim 1, wherein determining the system state comprises detecting a temperature of a component with which the DC/DC converter is in thermal contact.

9. The method according to claim 1, wherein the determining of the system state is indicated to the DC/DC converter by an input signal.

10. A system comprising an energy source and a DC/DC converter comprising a plurality of converter switches which are jointly connected to a DC bus, the system further comprising a control device which is configured to:
determine a system state in which electrical power is available from the energy source for which no transmission via the DC/DC converter and no output to further participants of the DC bus is provided, and
operate the DC/DC converter during the determined system state such that power dissipation is generated in the DC/DC converter without power being transmitted via the DC/DC converter.

11. The system according to claim 10, wherein the plurality of switches comprises a first switch, a second switch, a third switch and a fourth switch, wherein the first switch is thermally coupled to at least one of the second, third, and fourth switches.

12. The system according to claim 10, wherein the first and second switches form a first half-bridge and the third and fourth switches comprise a second half-bridge, and wherein a center node of each of the first and second half-bridges are connected together via a choke, and wherein the first switch is thermally coupled to the choke as a heat storage device.

13. The system according to claim 12, wherein the plurality of switches and the choke are thermally coupled to a common heat sink.

14. The system according to claim 10, wherein the energy source comprises a PV generator.

15. The system according to claim 10, wherein the DC/DC converter comprises a first sub-converter and a second sub-converter, which are each connected to the DC bus at an input side and are configured to transmit power flows of equal magnitude but opposite to one another, when the system state is determined, in a state where the first and second sub-converters are connected in parallel at their respective output side, so that switches of the first and second sub-converters are kept in a heated state without a power transmission of the DC/DC converter external to the DC/DC converter.

16. The system according to claim 15, wherein the system is configured to realize the parallel-connected state of the first and second sub-converters at output sides thereof via a coupling switch arranged between respective output terminals of the first and second sub-converters.

17. An energy generation plant comprising the system according to claim 10 and an inverter connected to the DC bus for feeding the power generated by the energy source into an alternating current network.

* * * * *